(12) United States Patent
Zeitler et al.

(10) Patent No.: US 6,345,217 B1
(45) Date of Patent: Feb. 5, 2002

(54) AUTOMATED GUIDED VEHICLE (AGV) WITH BIPOLAR MAGNET SENSING

(75) Inventors: David W. Zeitler, Caledonia; Andrew R. Black, Ravenna; Clyde Miin-Arng Ko, Ada, all of MI (US)

(73) Assignee: Rapistan Systems Advertising Corp., Grand Rapids, MI (US)

( * ) Notice: Subject to any disclaimer, the term of this patent is extended or adjusted under 35 U.S.C. 154(b) by 0 days.

(21) Appl. No.: 09/539,687

(22) Filed: Mar. 31, 2000

(51) Int. Cl.[7] .................................................. G05D 1/00
(52) U.S. Cl. ........................................ 701/23; 318/587
(58) Field of Search ............................ 701/23; 318/580, 318/587

(56) References Cited

U.S. PATENT DOCUMENTS

| | | | | |
|---|---|---|---|---|
| 4,908,557 A | * | 3/1990 | Sudare et al. ................ | 318/587 |
| 5,189,612 A | * | 2/1993 | Lemercier et al. ............ | 701/23 |
| 5,191,528 A | * | 3/1993 | Yardley et al. ............... | 701/23 |
| 5,216,605 A | * | 6/1993 | Yardley et al. ............... | 701/23 |
| 5,434,781 A | * | 7/1995 | Alofs et al. .................... | 701/23 |
| 5,853,846 A | * | 12/1998 | Clark et al. .................... | 701/23 |
| 5,883,587 A | * | 3/1999 | Ikemoto ...................... | 340/988 |
| 6,035,248 A | * | 3/2000 | Nagai et al. .................. | 701/23 |

* cited by examiner

Primary Examiner—Michael J. Zanelli
Assistant Examiner—Eric M Gibson
(74) Attorney, Agent, or Firm—Van Dyke, Gardner, Linn & Burkhart, LLP

(57) ABSTRACT

An automated guided vehicle system and method includes providing at least one automated-guided vehicle (AGV) and a pathway for the AGV. A sensor assembly on the AGV senses magnet assemblies on the pathway as the AGV is transported over that magnet assembly. A navigation and guidance system determines the location of the maximum magnitude of the magnetic field by mathematically fitting a curve to the magnitude of portions of the magnetic field sensed by said magnetic sensors and determines a maximum value of the curve. At least some of the said magnet assemblies each produce a bipolar magnetic field extending generally transverse to the pathway and the sensor assembly produces an output indicative of magnitude and polarity of respective portions of the bipolar magnetic field. The navigation and guidance system determines a location of maximum magnitude of the opposite polarities of the bipolar magnetic field and a correction factor. The correction factor corrects for offset of the maximum magnitudes of the field from a predetermined location on that magnet assembly including correcting for any skew of the bipolar magnetic field with respect to said pathway.

27 Claims, 12 Drawing Sheets

AUTOMATED GUIDED VEHICLE (AGV) WITH BIPOLAR MAGNET SENSING

BACKGROUND OF THE INVENTION

This invention relates generally to automated-guided vehicle (AGV) systems and, in particular, to navigation and control systems for guiding an automated-guided vehicle along a system guide path. The invention finds application in material handling, such as movement of material within a factory, as well as on-road and off-road vehicles.

Automated-guided vehicles have become extremely effective at movement of materials between processes in a manufacturing plant. Each of a plurality of AGVs automatically carries a load from a pickup point to a discharge point along a system guide path. Navigation of the AGV is typically either by reference to fixed guides, such as guide wires positioned in the floor along the guide path, or by dead-reckoning. Dead-reckoning systems utilize sensors within the AGV in order to monitor the heading, rate-of-change of heading and distance traveled by the AGV along its longitudinal axis which is controlled to coincide with the guide path. The dead-reckoning systems are advantageous because they avoid the enormous expense of placing guide wires in the floor along the entire guide path. Additionally, such dead-reckoning systems are flexible because the guide path layout may be altered by programming changes in the controls rather than requiring tearing and repositioning of the guide wires.

Dead-reckoning systems rely upon an integration of the rate of turn of the vehicle and the distance traveled to maintain position information of the vehicle. Because such measurements tend to drift with time, it is known to supplement the dead-reckoning navigation system with a location verification system, such as markers positioned at known locations along the system guide path. These markers are sensed by a sensor assembly on the AGV as the AGV moves along the guide path in order to verify and compensate, if necessary, the position of the AGV.

One type of marker is a cylindrical magnet positioned in the floor which is sensed by a sensor assembly made up of a series of magnetic sensors, such as Hall-effect sensors, laterally spaced along the bottom of the AGV body. Every time the vehicle passes over a magnet, a location of the body with respect to the magnet is determined from the outputs of the magnetic sensors and used to update the position information of the vehicle. An example of such a system is disclosed in U.S. Pat. No. 4,772,832 to Okazaki et al. Such a system is also utilized in automated-guided vehicle systems marketed by Applicants' assignee, Rapistan Systems of Grand Rapids, Mich. The Rapistan Systems AGV is marketed under various model numbers, such as Model No. DT-100, and is embodied in various forms. These include tuggers and unit load carriers, to name a few. The sensor assembly employed in the Rapistan Systems AGV includes a series of magnetic sensors in the form of Hall-effect sensors spaced approximately 1 inch apart. The position of the vehicle with respect to a magnet is determined by identifying the three sensors having the highest output and interpolating the values of the outputs to identify the maximum magnetic field intensity sensed by the sensor assembly. While the theoretical accuracy of such system is within ¼ inch, there is a tendency for the existing algorithm solution to group, or settle, at the integer distance values, i.e., every inch, which corresponds to the locations of the magnetic sensors. This tendency to settle on the integers reduces the accuracy of the detection of the magnet.

Another difficulty with the known magnet-based position update system is that the magnet is positioned with one of its opposite poles directed upwardly so that the magnetic field sensed by the sensor assembly is always unipolar and of the same polarity. While this makes identification of the maximum magnetic field strength easier, the system is unable to determine the direction that the vehicle body passes over each magnet. Information on the direction that the vehicle passes each magnet could be helpful to the system.

For example, each vehicle must be initialized into the system at an initialization station. An initialization station consists of two spaced apart magnets at a unique distance. The initialization station provides initial position and bearing information to the vehicle dead-reckoning system to allow the vehicle to travel along the guide path. Because it is necessary that each initialization station be uniquely identified to the vehicle, various schemes have been proposed to provide that information to the vehicle. One scheme is to vary the spacing between the magnets at the initialization station. For example, the two magnets may be spaced apart at unique separation distances which, for example, may be between 4 feet and 15 feet. In order to accommodate tolerances, the unique separation distances are provided in steps, such as 6-inch steps, in order to ensure that one initialization station is not mistaken for another. The requirement that the separation of the magnets be uniquely assigned in no finer than 6-inch increments and between fixed limits, such as 4 feet and 15 feet, severely limits the number of initialization stations in the system. In this example, no more than 22 stations are possible. This, in turn, limits the flexibility in constructing very large systems.

Furthermore, with the known initialization station, it is possible to erroneously initialize the vehicle traveling in the wrong direction across the two magnets. This may occur even though an arrow may be inscribed on the floor adjacent the magnets. When a vehicle is initialized in this manner, operation of the vehicle is erroneous.

Proposals have been made for magnetic position update systems that present magnetic fields of opposite polarity, generated by the north and south poles of the magnet at the surface of the pathway, for sensing by the sensor assembly. One such system is disclosed in U.S. Pat. No. 4,908,557 issued to Sudare et al. In Sudare et al., a position of the vehicle with respect to each magnet is determined by repeatedly scanning the magnetic sensors as the vehicle passes over the magnet in order to determine a region pair which includes two regions of equal level of magnetic magnitude. A shortest distance is obtained with respect to the two regions and a center position of the two regions is selected on the basis of the shortest distance. This is supposed to represent a null point between the opposite polarity fields. While the Sudare et al. system provides the ability to determine the direction that the vehicle passes over each magnet, it is not without its difficulties. The Sudare et al. system has precision of measurement on the order of magnitude of center-to-center spacing of the Hall-effect sensors.

One of the difficulties in sensing a position of an AGV body with respect to a magnet assembly producing a bipolar magnetic field is that the maximum strength of the associated polarity of the field does not tend to correspond with any physical place on the magnet, such as the north face or south face. In order to be able to determine a relative position between an AGV body and a magnet assembly, a predetermined position on the magnet assembly must be selected for sensing. Because the maximum field strength for a polarity does not necessarily correspond with a location on the magnet generating the bipolar magnetic field with respect to the surface the vehicle travels, it becomes difficult to locate the magnet assembly in the coordinates of the factory floor. Another difficulty with sensing the bipolar magnetic field is that, unlike a unipolar magnetic field, the axis passing through the north and south poles can become skewed with respect to the guide path unless expensive placement techniques are used. Such skewing could significantly affect the ability to establish a unique position of the magnet assembly with respect to the vehicle body.

SUMMARY OF THE INVENTION

The present invention provides an automated-guided vehicle system in which position updates are obtained from magnets generating bipolar magnetic signals in which accuracy of the relative position between the vehicle and the magnet assembly is significantly better than that achieved by the prior art. By utilizing magnet assemblies capable of producing bipolar magnetic signals, the present invention provides information on the direction being traveled by the vehicle as it traverses a magnet assembly. This may be useful in providing an improved initialization station as well as other enhanced features in an AGV system.

The present invention also provides data on absolute magnitude of the sensed magnetic field generated by the magnet assembly. This information may be useful in providing a diagnostic system whereby successive readings obtained at each magnet assembly may be compared in order to monitor the operation of each magnet assembly. The successive readings may be taken by the same vehicle every time it passes over a particular magnet assembly, or by multiple vehicles traversing the same magnet assembly. When successive readings taken at the same magnet assembly indicate variation in sensed absolute magnitude of the magnetic field, or variation from one magnet assembly to the other magnet assemblies, a diagnosis may indicate a defective magnet assembly or a change in its operating environment.

An automatic-guided vehicle system, according to an aspect of the invention, includes at least one automated-guided vehicle and pathway for the at least one automated-guided vehicle. The at least one automated-guided vehicle includes a body, a plurality of wheels for transporting the body across a surface, a navigation and guidance system and a sensor assembly. The pathway is defined by a surface and includes a plurality of magnet assemblies positioned along the surface. Each of the magnet assemblies includes at least one magnet defining a pair of opposite magnet poles. The sensor assembly is made up of a plurality of magnetic sensors extending generally transverse to the pathway. The sensor assembly is positioned at the body for sensing each magnet assembly as the body is transported over that magnet assembly by its wheels. The sensor assembly produces an output indicative of intensity of respective portions of the magnetic field sensed by the magnetic sensors. The navigation and guidance system receives the output from the sensor assembly and determines from the output a location of maximum magnitude of the magnetic field sensed by the sensor assembly at each magnet assembly. The navigation and guidance system determines a position of the body with respect to a magnet assembly as the sensor assembly passes over that magnet assembly from the maximum magnitude of the magnetic field. According to this aspect of the invention, the navigation and guidance system determines the location of the substantially maximum magnitude of the magnetic field by mathematically fitting a curve to the intensity of portions of the magnetic field sensed by the magnetic sensors and determining a maximum value of the curve.

According to another aspect of the invention, an automated-guided vehicle system includes at least one automated-guided vehicle and a pathway for the at least one automated-guided vehicle as previously set forth. According to this aspect of the invention, at least some of the magnet assemblies each produce a bipolar magnetic field at the surface extending generally transverse to the pathway with respect to movement of the at least one automated-guided vehicle along the pathway. The sensor assembly is made up of magnetic sensors extending generally transverse to the pathway. The sensor assembly is positioned at the body for sensing the bipolar magnetic field of each of the magnet assemblies as the body is transported over the magnet assembly by the wheels. The sensor assembly produces an output indicative of the magnitude and polarity of respective portions of the magnet field sensed by the magnetic sensors. The navigation and guidance system receives the output from the sensor assembly and determines from the output a location of the substantially maximum magnitude of at least one polarity of the bipolar magnetic field sensed by the sensor assembly at each magnet assembly. The navigation and guidance system determines a position of the body with respect to the magnet assembly as the sensor assembly passes over that magnet assembly from the substantially maximum magnitude of the at least one polarity of the bipolar magnetic field sensed by the sensor assembly. According to this aspect of the invention, the navigation and guidance system determines a correction factor for correcting offset between the substantially maximum magnitude of the at least one polarity and predetermined location on that magnet assembly, including correcting for any skew of the bipolar magnetic field with respect to the pathway for the magnet assembly. The navigation and guidance system corrects the position of the body with respect to a magnet assembly with the correction factor for that magnet assembly.

A method of guiding an automated-guided vehicle, according to an aspect of the invention, includes providing at least one automated-guided vehicle and a pathway for the at least one automated-guided vehicle. The pathway is defined by a surface and includes a plurality of magnet assemblies positioned along the surface. The at least one automated-guided vehicle includes a body and a sensor assembly made up of a plurality of magnetic sensors extending generally transverse to the pathway. A method according to this aspect of the invention includes sensing each magnet assembly with the sensor assembly as the body is transported over the magnet assembly thereby producing an output indicative of intensity of respective portions of the magnetic field sensed by the magnetic sensors. The method further includes determining a location of the substantially maximum magnitude of the magnetic field sensed by the sensor assembly at each magnet assembly and determining a position of the body with respect to a magnet assembly as that sensor assembly passes over that magnet from the substantially maximum magnitude of the magnetic field. The method further includes determining the location of the substantially maximum magnitude of the magnetic field by mathematically fitting a curve to the intensity of portions of magnetic fields sensed by the magnetic sensors and determining a maximum value of the curve.

By determining a maximum value of the curve corresponding to the substantially maximum magnitude of the magnetic field, a database can be established of readings from multiple passes across each of the magnet assemblies. In this manner, diagnosis of the condition of each magnet assembly can be made and maintained in order to determine when maintenance is required on any particular magnet assembly or on an automated-guided vehicle. Furthermore, determining of a maximum value of a curve mathematically fitted to the intensity of portions of magnetic fields sensed by the magnetic sensors provides an exceptionally accurate value of maximum magnitude of the magnetic field sensed by the sensor assembly. In this manner, a more accurate determination of a position of the AGV body with respect to the magnet assembly as the sensor assembly passes over that magnet assembly can be made, thereby improving the overall accuracy of the guidance of the AGVs.

A method of guiding an automated-guided vehicle according to yet another aspect of the invention includes providing at least one automated-guided vehicle and a pathway for the at least one automated-guided vehicle. The pathway is defined by a surface and includes a plurality of magnet assemblies positioned along the surface. At least some of the magnet assemblies includes at least one magnet defining a pair of opposite magnetic poles producing a bipolar magnetic field at the surface extending generally transverse to the pathway with respect to movement of the automated-guided vehicle along the pathway. The at least one automated-guided vehicle includes a body and sensor assembly made up of a plurality of magnetic sensors extending generally transverse to the pathway. The sensor assembly produces an output indicative of the magnitude and polarity of respective portions of the bipolar magnetic field sensed by the magnetic sensors. The method, according to this aspect of the invention, includes receiving outputs from the sensor assembly and determining from the outputs a location of substantially maximum magnitude of at least one polarity of the bipolar magnetic field and determining a position of the body with respect to a magnet assembly as the sensor assembly passes over that magnet assembly from the substantially maximum magnitude of the at least one polarity of the bipolar magnetic field sensed by the sensor assembly. The method further includes determining a correction factor for correcting offset between the substantially maximum magnitude of the at least one polarity and a predetermined location on that magnet assembly including correcting for any skew of the bipolar magnetic field with respect to the pathway for that magnet assembly. The method further includes correcting the position of the body with respect to the magnet assembly with the correction factor for that magnet assembly.

By providing the ability to accurately determine the location of the AGV body with respect to a magnet assembly producing a bipolar magnetic field transversed to the pathway, the present invention, for the first time, facilitates the use of magnet assemblies producing such bipolar magnetic fields without detriment to the position updating function. This is accomplished by determining a correction factor. The correction factor allows a precise determination of a location of the vehicle with respect to a location, such as the north face, or south face of the magnet assembly. This is in contrast to prior art magnet assemblies positioned with their bipolar magnetic field transverse the pathway, wherein the vehicle attempts to identify the null between the opposite polarity fields. Furthermore, the correction factor corrects for any skew of the bipolar magnetic field thereby reducing the necessity for accurately positioning the magnets with respect to the pathway.

By facilitating the use of magnets producing a bipolar magnetic field transverse the pathway, the present invention provides an indication to the vehicle of the direction the vehicle is travelling with respect to the magnet. This provides the ability to, for the first time, code the magnets defining an initialization station in order to increase the number of uniquely identifiable initialization stations in the system. In addition, it is possible to determine that an automated-guided vehicle has traversed the initialization station in an incorrect direction thereby indicating the need to perform the initialization function over again.

Furthermore, the use of a magnet assembly producing a bipolar magnetic field transverse the pathway allows the magnet assembly to function as a signaling device signaling information to the vehicle. For example, one pole of the bipolar magnetic field may be an electromagnet that is controllable as part of an overall control scheme. By selectively activating that pole, the magnet assembly may perform the same function presently being performed by beacon assemblies. For example, the selective activation of one pole may provide an indication to the vehicle that it is supposed to take a particular path to a junction point. This is especially useful for certain types of systems which do not provide wireless destination codes to the vehicle. The present invention provides the ability for such system to locally indicate to the vehicle, for example, the beckoning of that vehicle by an operator or the like.

These and other objects, advantages and features of this invention will become apparent upon review of the following specification in conjunction with the drawings.

DESCRIPTION OF THE PREFERRED EMBODIMENT

Figure 1:
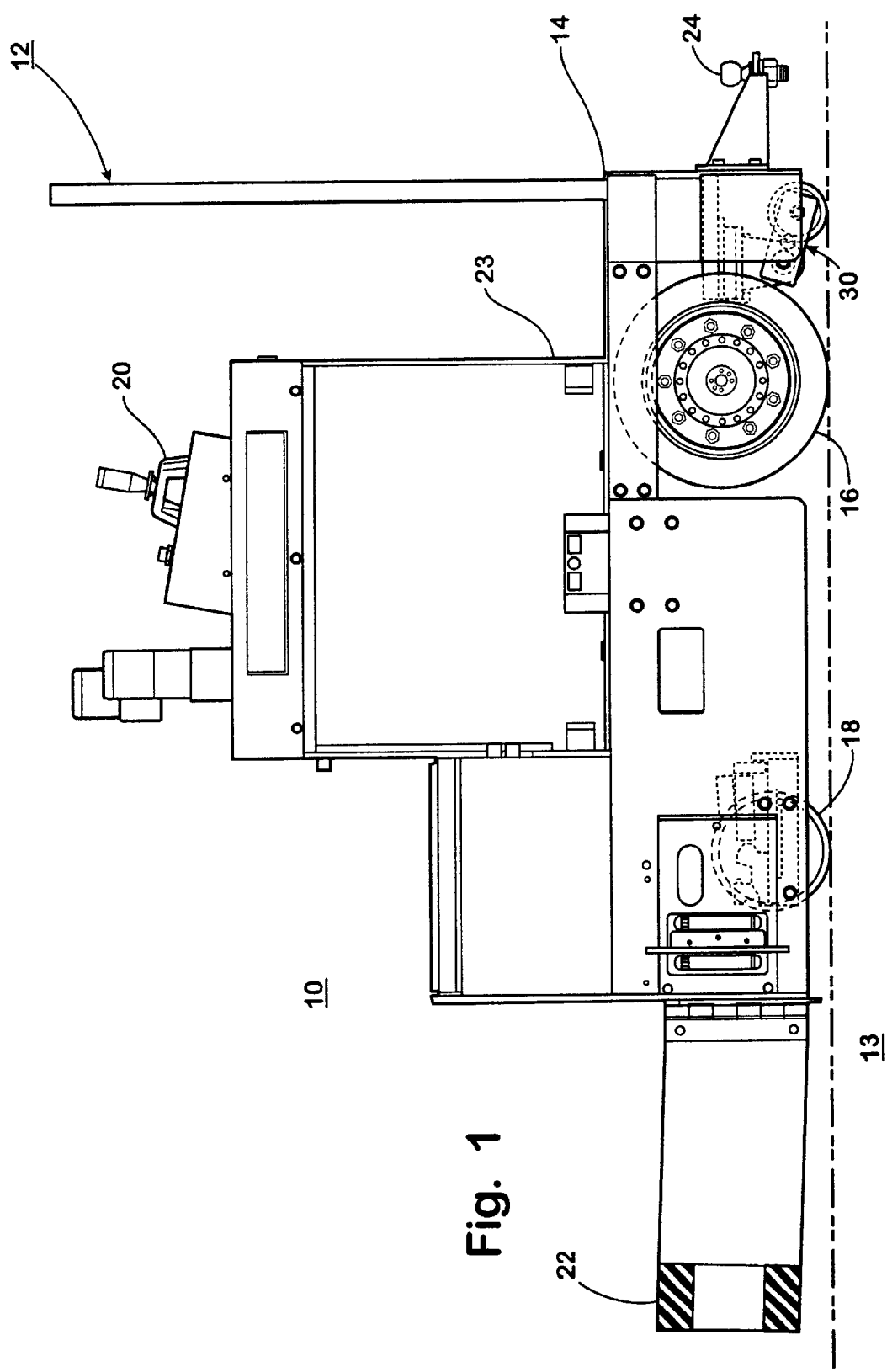
FIG. 1 is a side elevation of an automated-guided vehicle, according to the invention.

Referring now specifically to the drawings, and the illustrative embodiments depicted therein, an automated-guided vehicle system 10 includes one or more automated-guided vehicles 12 and a pathway 13 for the automatic-guided vehicle(s) (FIGS. 1–4). Each AGV 12 includes a body 14 whose weight is supported by wheels including one or more rear drive wheels 16 and one or more forward steering wheels 18. AGV 12 is generally of the type described in commonly assigned U.S. Pat. No. 5,764,014 issued to Jakeway et al., the disclosure of which is hereby incorporated herein by reference. AGV 12 is described in detail in the '014 patent and will not be repeated herein. Suffice it to say, AGV 12 includes a local operator console 20 in order for the vehicle to be manually operated and to be initialized into the pathway 13. The AGV may also be provided with destination codes, such as via an RF link 32, as well as information of the position of other AGVs in the system so that each AGV is capable of avoiding collisions with other AGVs. AGV 12 additionally includes a forward bumper 22 in order to sense impact with an object in the AGV's guide path and, optionally, a hitch 24 in order to pull trailers. Each AGV 12 is powered from a bank of batteries, located in a compartment 23, which supplies an electric DC motor 26 associated with each drive wheel 16 through a motor control 27. AGV 12 may additionally include a ground track sensor generally shown at 30 for continuously sensing in conjunction with the gyro the movement of the body 14 in a lateral and longitudinal direction of the vehicle as it travels along its guide path.

AGV 12 additionally includes a navigation and guidance system 66 including a Heading Reference Sensor (HRS) 70, a sensor assembly 72, for sensing magnet assemblies 28 in order to update the position of the AGV stored in navigation and guidance system 66. The primary navigation system may additionally include a Distance Measuring Encoder (DME) of a steering wheel 76. Steering wheel assembly 76 may additionally include an angle encoder 78, which produces an output 82 to a steering control 84 indicative of the angle of steering wheel 18 under the control of steering control 84. Navigation and guidance system 66 additionally includes a navigation computer 58 and a vehicle computer 90. Navigation computer 58 receives inputs from ground track sensor 30, a HRS 70, a DME 74 and a sensor assembly 72.

Pathway 13 is defined by a surface 34, such as a shop floor, road surface, or the like, and a virtual guide path 36, stored in memory in each AGV 12 which defines a path along surface 34. Each virtual guide path 36 includes one or more magnet assemblies 28 spaced along the virtual guide path in order to update the position of the AGV as it travels along the virtual guide path as is understood by those skilled in the art. The pathway 32 may additionally include one or more stations 38 which provide destinations for AGVs 12. A Constant System Monitor (CSM) 40 may additionally be provided in order to re-transmit blocking codes between AGVs 12 as well as to transmit destination codes, each identifying a station 38, to the vehicles 12. On very simple systems, the CSM 40 may provide only transmission of blocking codes between vehicles or may be eliminated altogether.

Pathway 13 may additionally include one or more initialization stations 42 which are uniquely identified locations to introduce AGVs 12 into pathway 32. This is necessary in order to coordinate the information in navigation and guidance system 66 with the location and direction of movement of the AGV 12. Each initialization station includes two magnet assemblies 28 which are separated a distance D. Traditionally, distance D is varied from one initialization station to the next in order to uniquely identify each initialization station. By way of example, in a conventional automated-guided vehicle system, the distance D may vary from 4 feet to 15 feet in 6-inch increments. Such conventional system would be limited to 22 initialization stations. Additionally, initialization station 42 may include an indicia 44 in order to indicate to a vehicle operator the direction that the vehicle is to traverse the magnet assemblies 28 making up the initialization station 42. As will be set forth in more detail below, the present invention provides a unique ability to increase the number of initialization stations 42 by uniquely identifying magnet assemblies 28 as having each one of two possible orientations with respect to guide path 36. This provides the two magnet assemblies of each induction station to have 8 unique combinations of orientations. This may increase the number of possible initialization stations by a factor of 4. Alternatively, the orientations of magnet assemblies 28 may be arranged in order to identify the direction that an AGV is to be inducted to the pathway 32. For example, if the protocol is that the magnet assemblies 28 at each initialization station are to have a particular orientation, the AGV navigation and guidance system will be able to determine if it is being operated to the initialization station in the wrong direction if the reading of the magnet assemblies indicates that the magnet assemblies have a different orientation than that expected.

Figure 4:
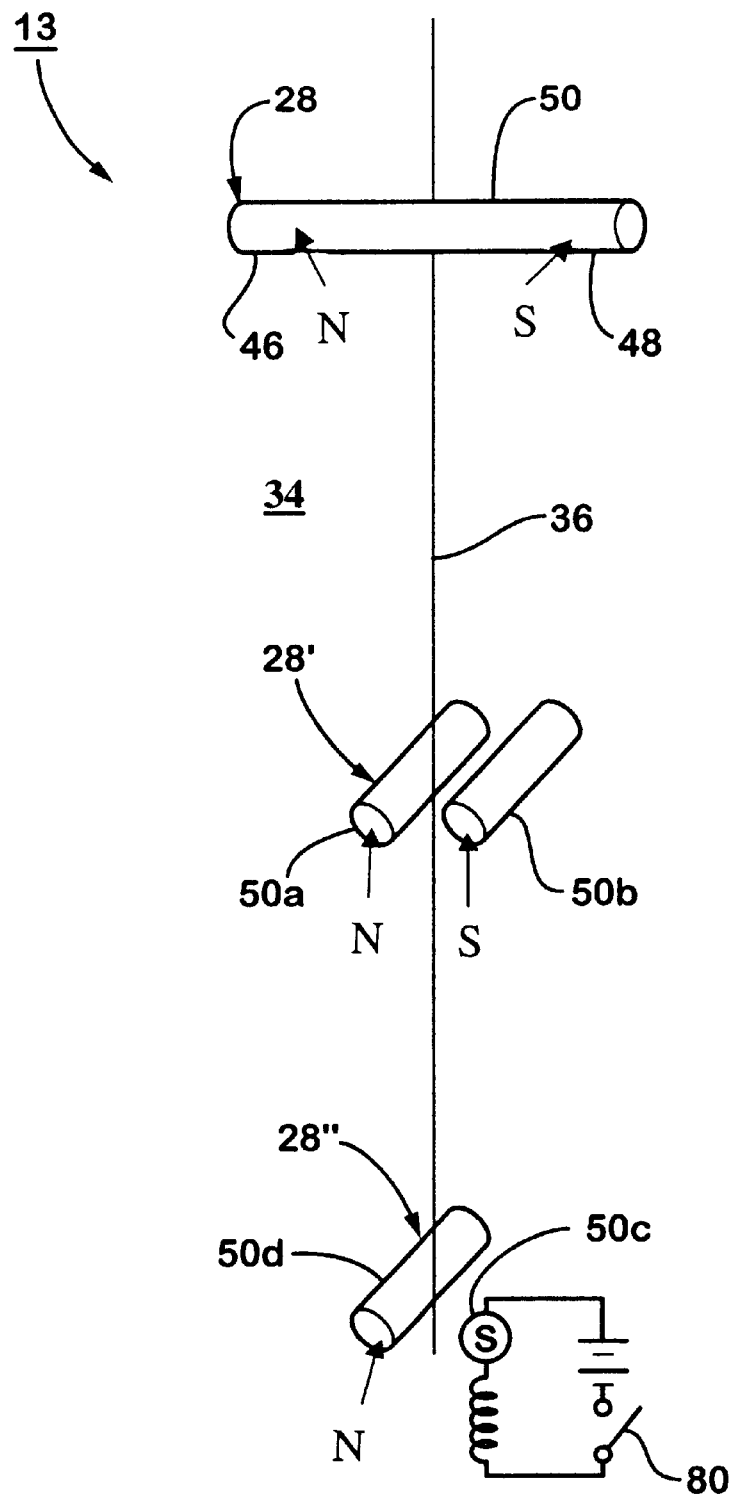
FIG. 4 is an enlarged top plan view of a portion of the pathway in FIG. 3.

The ability of AGV 12 to determine both the position of its body 14 with respect to a magnet assembly 28 and, additionally, a direction that a body 14 is traversing the magnet assembly 28 is a result of at least some of the magnet assemblies 28 producing a bipolar magnetic field by that magnet assembly at surface 34 with respect to movement of AGV 12 along virtual guide path 36 (FIG. 4). The bipolar magnetic field is generated by exposing both a magnetic north pole 46 and a magnetic south pole 48 at surface 34. This may be accompanied by positioning an individual magnet 50 with its magnetic poles 46 and 48 at surface 34. Alternatively, a magnet assembly 28' may be provided having separate magnets 50a and 50b positioned adjacent each other with one magnet's north pole at surface 34 and the other magnet's south pole at surface 34. Alternatively, a magnet assembly 28" may be provided having one or more poles 50c supplied by an electromagnet. Magnet assembly 28" may be used as a signaling device to signal to AGV 12 the state of an input 80, as will be set forth in detail below. Controllable magnetic poles 50c may be combined with a permanent magnetic pole 50d or with another electromagnetic pole. Either way, the magnetic field produced by magnet assembly 28, 28' is bipolar as sensed above the magnet assembly by an AGV 12 traversing surface 34 along virtual guide paths 36 as will be set forth in more detail below. The magnetic field produced by magnet assembly 28" may be unipolar or bipolar depending upon the state of input 80.

Figure 2:
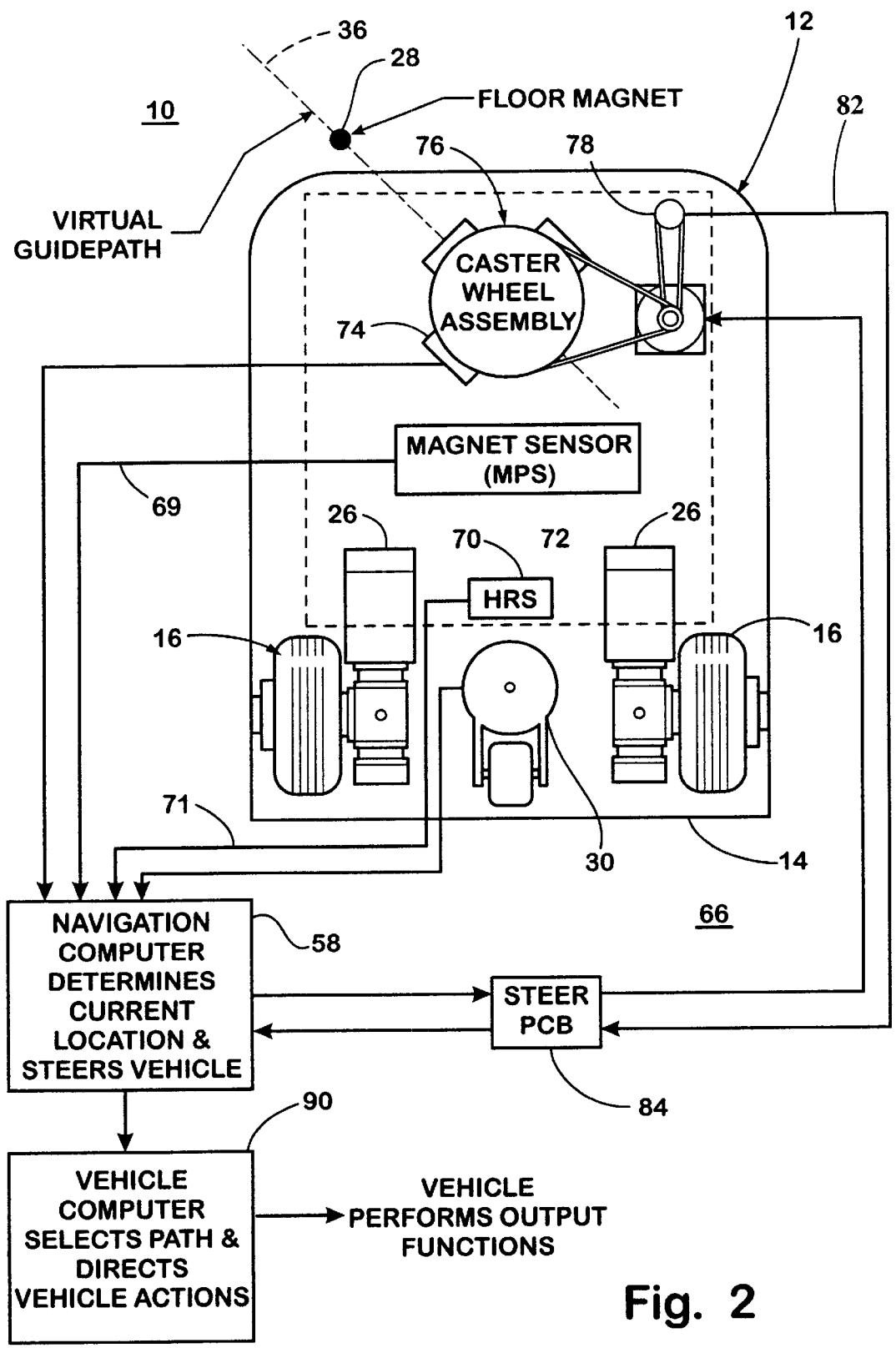
FIG. 2 is a bottom plan view of an AGV illustrating layout and interconnection of major components of its navigation and guidance system.
Figure 3:
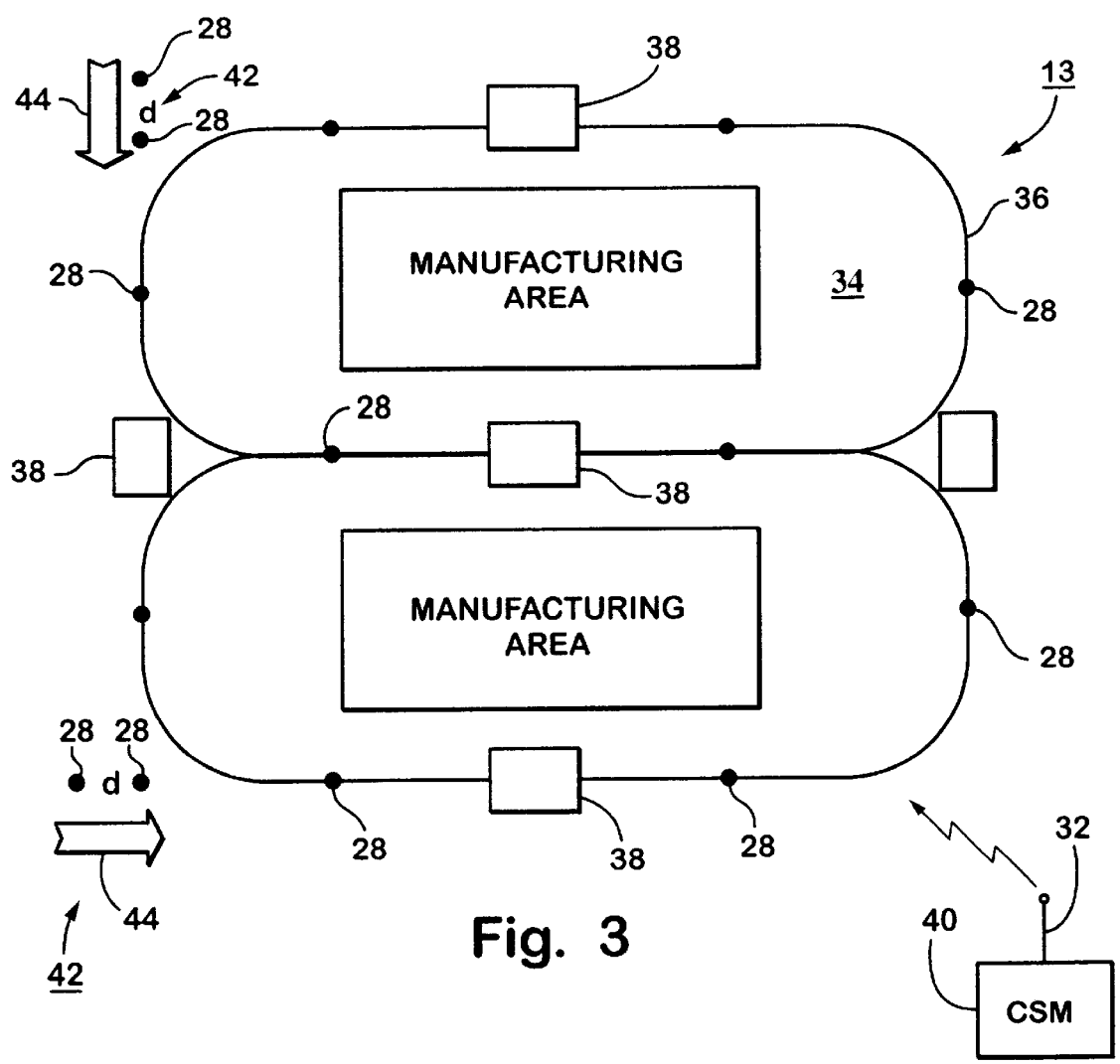
FIG. 3 is a top plan view of a pathway, according to the invention.
Figure 5:
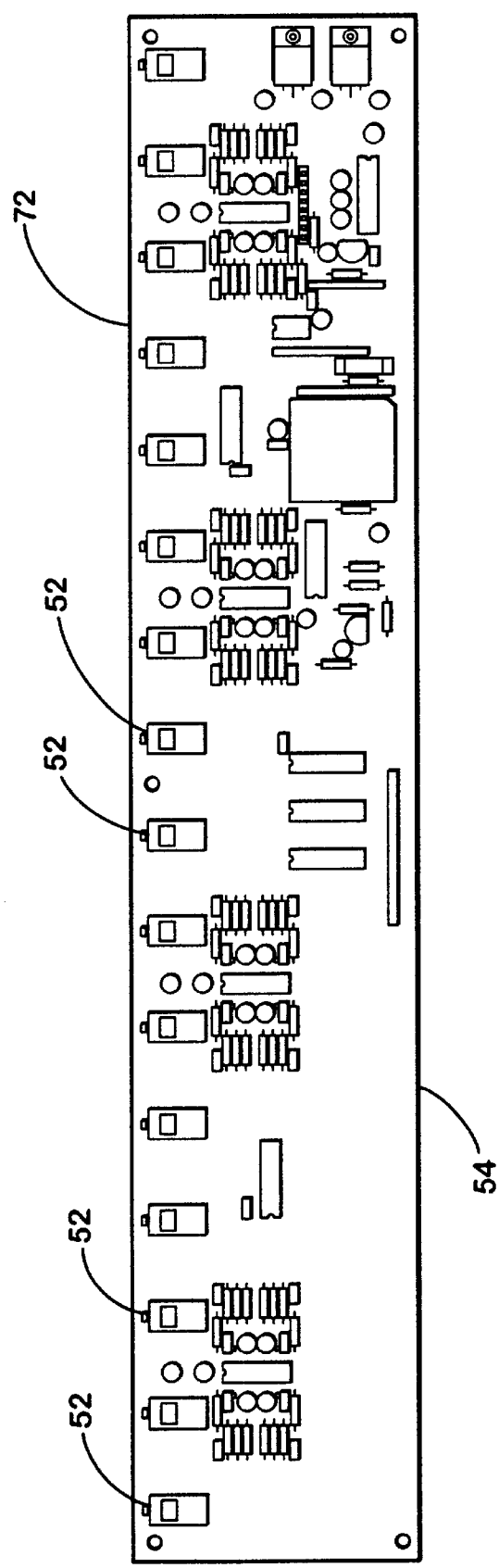
FIG. 5 is a top plan view of a magnet sensor assembly.
Figure 6:
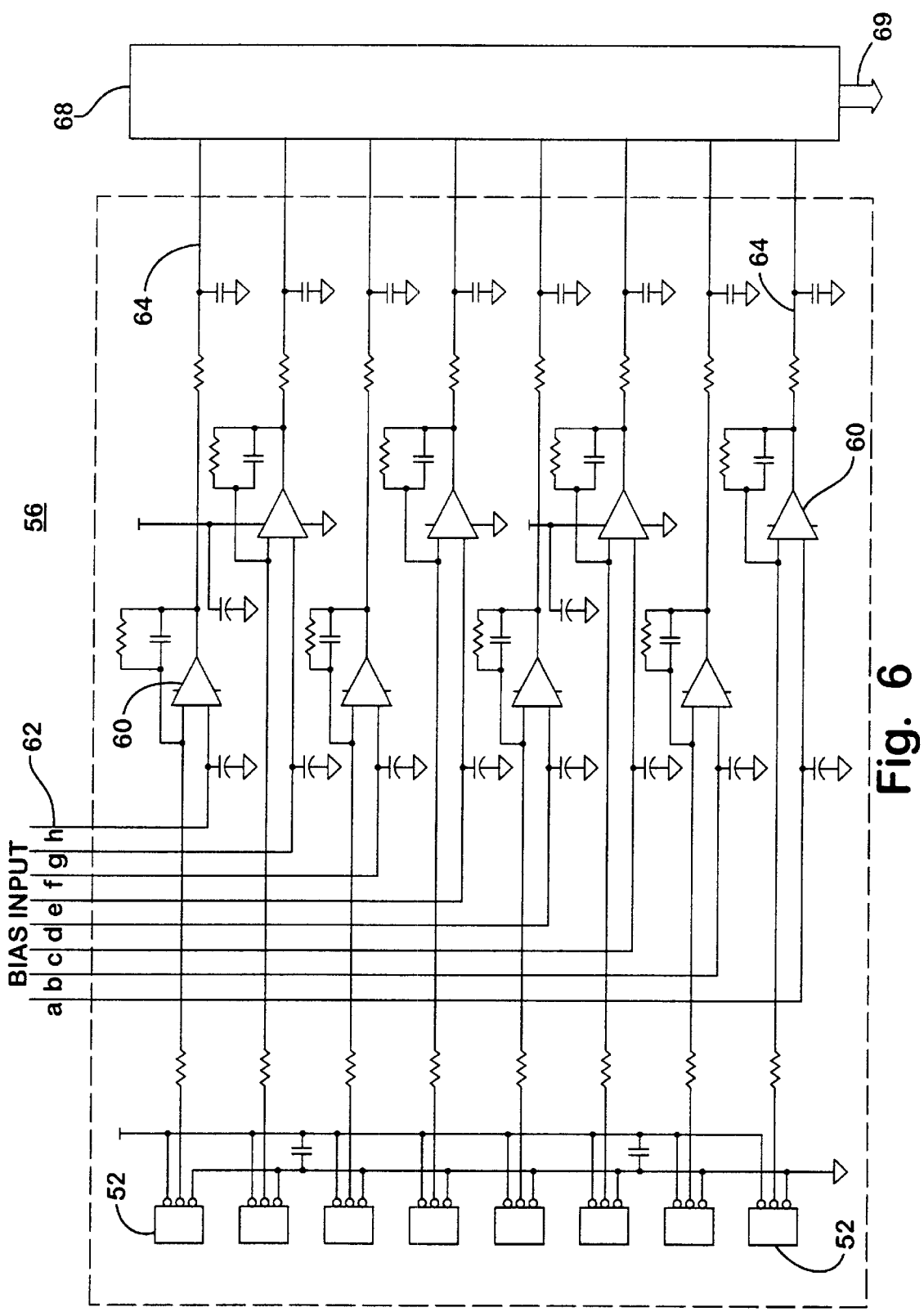
FIG. 6 is a partial electrical schematic diagram of the sensor assembly in FIG. 5.

Sensor assembly 72 includes a plurality of magnetic sensors 52 spaced apart from each other, typically a fixed distance, and supported by a support 54 which, in the illustrated embodiment, is a circuit board (FIGS. 5 and 6). Support 54 is mounted within a housing (not shown) and positioned at the underside of body 14, as best illustrated in FIG. 2. Sensor assembly 72 is positioned on body 14 such that magnetic sensors 52 are spaced apart in a direction transverse the direction of movement of AGV 12 along pathway 13. In the illustrated embodiment, magnetic sensors 52 are Hall-effect sensors but other magneto-responsive devices may be used. Hall-effect sensors, advantageously, produce an output which varies proportionately to the intensity of the magnetic field sensed by sensor assembly 72. Additionally, each magnetic sensor 52 is biased in a manner that it responds to the polarity of the magnet field to which it is exposed. Each magnetic sensor 52 is connected in a sensing circuit 56 which includes, for each magnetic sensor, an operational amplifier 60 which receives a bias input 62 and amplifies the output of the associated magnetic sensor 52 in a range established by the level of its bias input 62. The outputs 64 of the operational amplifiers are supplied to a digital processing system 68 which produces an output 69 supplied to navigation computer 58. Digital processor 68, which preferably includes a micro-computer, multiplexes outputs 64 and converts the analog signals to digital signals which are converted to a serial data stream output at 69. The serial data stream represents normalized levels of magnitude and polarity sensed by each magnetic sensor 52.

Figure 7:
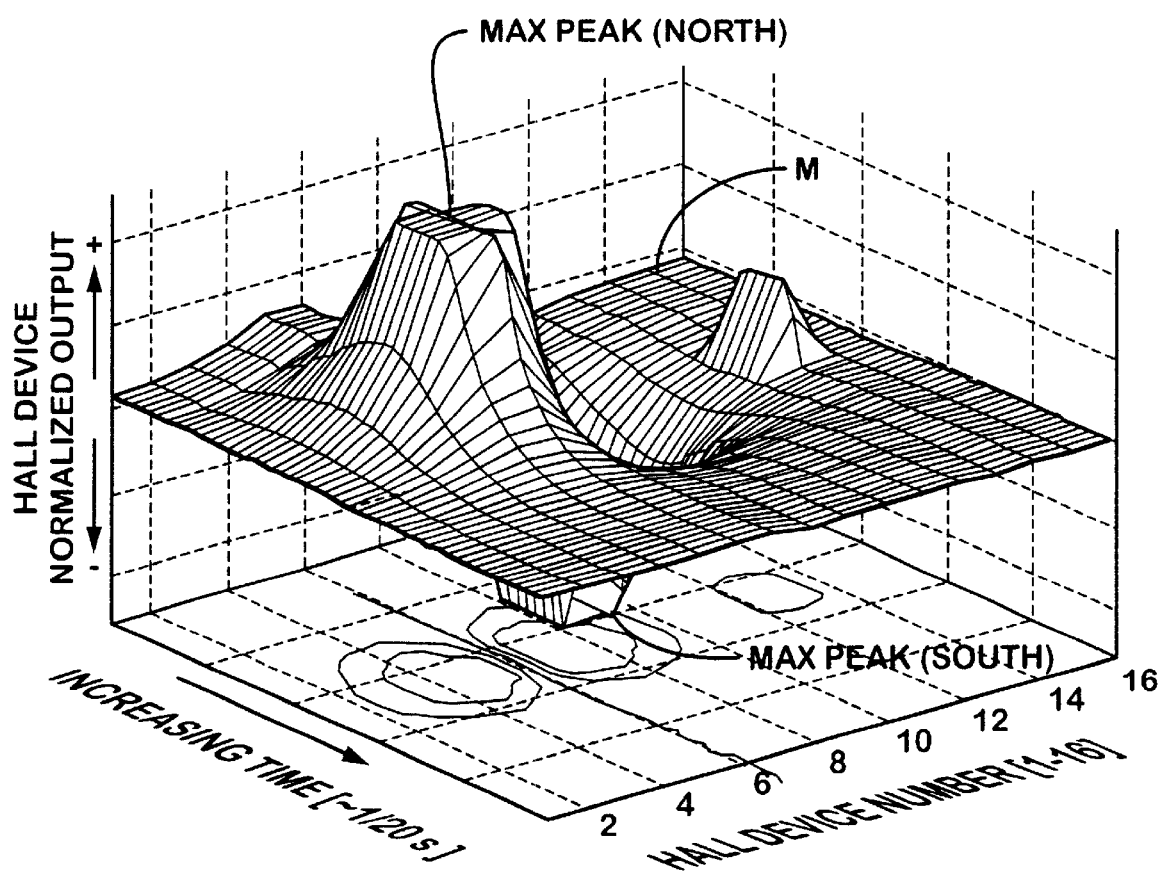
FIG. 7 is a three-dimensional plot of a bipolar magnetic field generated by each of the magnet assemblies in FIG. 4.
Figure 8:
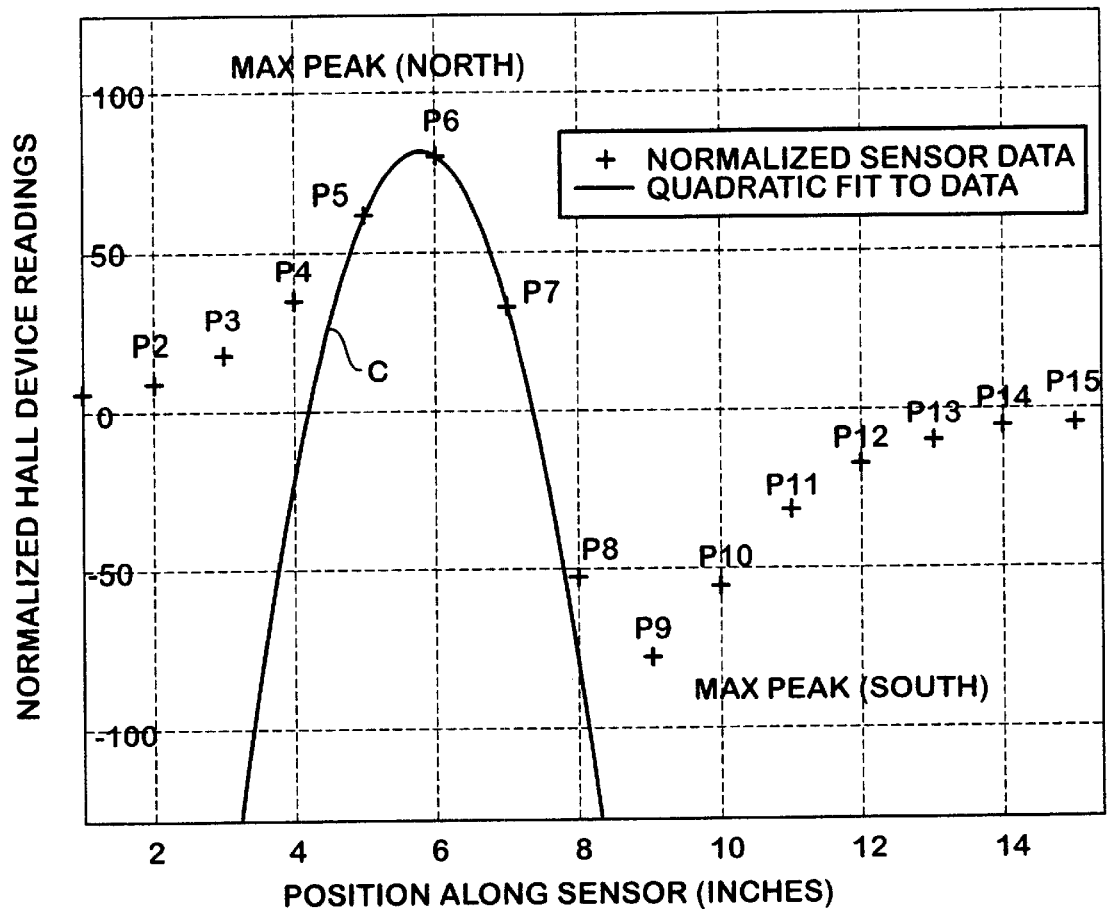
FIG. 8 is a plot of intensities of portions of the magnetic field in FIG. 7 as sensed by the magnetic sensors in FIG. 5 and with a quadratic curve fit to the data points for one of the polarities of the magnetic field.

More particular, as illustrated in FIG. 8, when sensor assembly 72 passes a magnet assembly 58 which produces a bipolar magnetic field, as illustrated in FIG. 7, output 69 of digital processor 68 provides data corresponding to that illustrated by points P1–P15 in FIG. 8. Referring to FIG. 8, points P1–P15 are calibrated to be at a zero reference when not exposed to a magnetic field. The points P1–P15 increase toward a generally maximum magnitude at a location of the maximum peak of a particular polarity, then reverse, and increase in the opposite direction at the location of an increase in the opposite polarity. As can be seen in FIG. 8, a maximum intensity of one polarity of magnetic field M occurs somewhere between points P5 and P6 while the maximum intensity of the opposite magnetic field occurs somewhere in the vicinity of points P9 and P10. Each point P2–P12 corresponds to the magnetic magnitude and polarity sensed by a magnetic sensor 52.

In order to more precisely identify maximum intensity of magnetic field M, a mathematical process is conducted whereby a curve C is fit to data points P5–P7 utilizing conventional curve fitting algorithms known in the field of mathematics. In the illustrated embodiment, a quadratic curve C meeting the definition of:

$$ax^2+bx+d=0 \qquad (1)$$

wherein:
 a, b and c are variables,
 curve C defines a parabola.

However, other curve-fitting algorithms may be utilized. In particular, a quadratic curve is selected because it provides adequate information with minimal computational cost. However, higher order curve fits with more sensor values could be used for greater possible precision. Indeed, even non-linear trigonometric function fits could be used. Once a fit is achieved, a maximum (or minimum) peak may be achieved utilizing conventional techniques. Applying such techniques to Equation 1, the peak is defined as:

$$\frac{-b}{2a} \qquad (2)$$

By mathematically fitting a curve to the data points, a more precise maximum, or minimum, peak of the magnetic field can be identified. This allows a more precise determination of the relative position of body 14 with respect to a magnet assembly 28 as the AGV passes over the magnet assembly. Furthermore, the present invention provides the ability to determine the magnitude of the maximum magnetic field sensed by sensor assembly 72. This magnetic intensity magnitude may be stored in a diagnostic computer and compared with previously read values of magnitude every time an AGV 12 passes over that particular magnet assembly. In this manner, the performance of each magnet assembly can be monitored and utilized to determine, for example, a degradation in performance of that magnet assembly. The present invention could also be used to monitor performance of an AGV 12 in its ability to sense the magnetic field of each magnet assembly 28. As will be apparent to those skilled in the art, a comparison of the magnitude of each magnet assembly taken with each AGV in the system would readily provide the ability to determine malfunctions of either a magnet assembly or an AGV.

Value of the location of the minimum peak, illustrated at approximately sensor P9 in FIG. 8, is also found. In the illustrated embodiment, this is accomplished by selecting the sensor having the minimum reading. However, curve fitting could also be applied to more precisely locate the minimum peak. With the maximum and minimum values of the magnetic field located, these values may be used to establish a factor as follows:

$$I = \frac{\max - \min}{\max} \qquad (3)$$

wherein:
 max and min are locations of the maximum and minimum values of the respective magnetic field, and I is an indication of angle of incidence between sensor assembly 72 and magnetic field M.

The angle of incidence I will increase as the relative locations of the max and min values, as sensed by the AGV, decrease and vice versa. In particular, if magnet assembly 28 is positioned with its north and south poles perpendicular to guide path 36, the locations of the min and max values will be greater than for any other orientation of the magnet with respect to the guide path.

Figure 9:
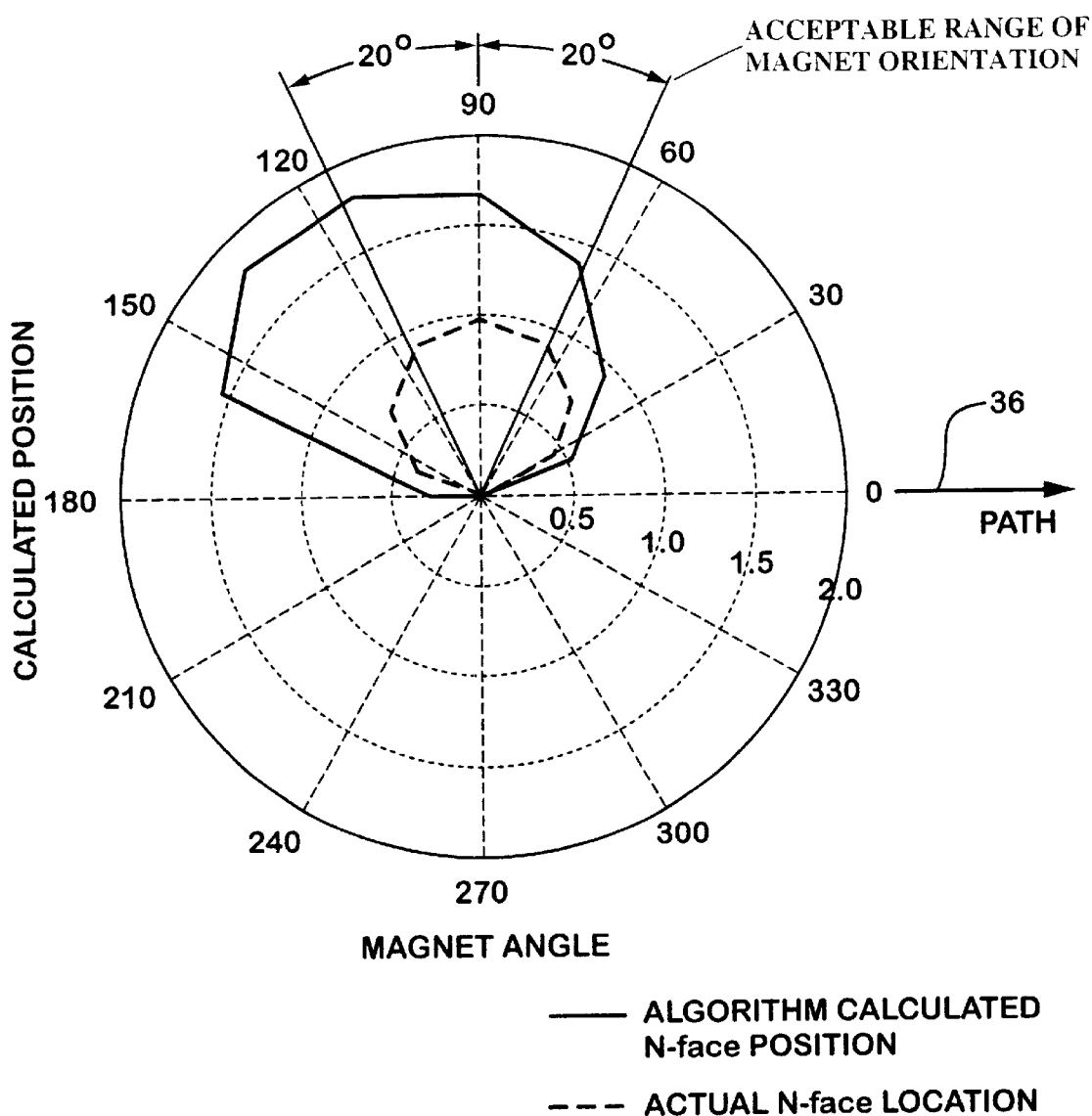
FIG. 9 is a diagram illustrating correction factor required to compensate for skew of the magnet assembly with respect to the guide path.
Figure 10:
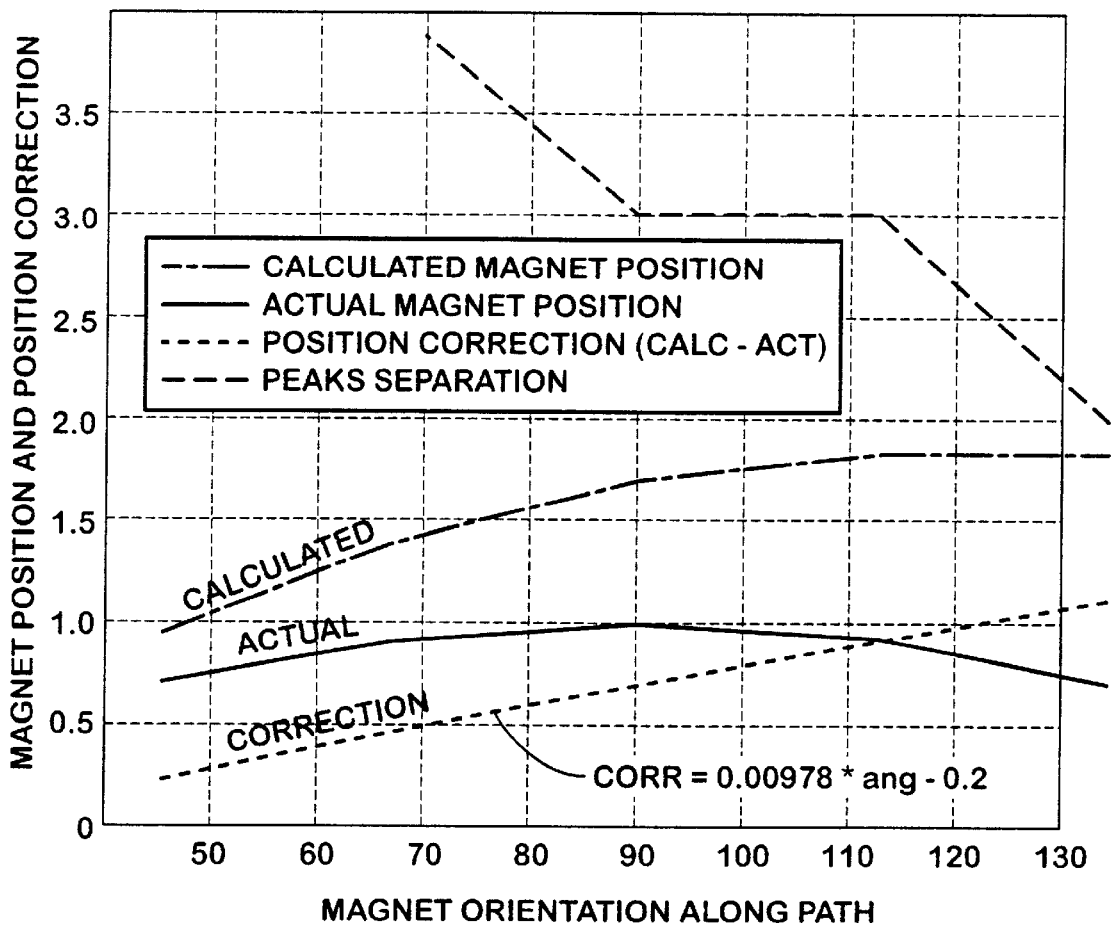
FIG. 10 is a diagram illustrating the linearity of a correction factor with respect to skew.

The relationship between the orientation of the poles of magnet assembly 28 and the guide path can best be illustrated by reference to FIGS. 9 and 10. FIG. 9 is a polar coordinate plot illustrating the relationship between a calculated value of a location on vehicle body 14 with respect to the magnet assembly 28 utilizing equation 2 versus the actual location of the body with respect to the magnet assembly. This is illustrated for various orientations of the magnet assembly with respect to the guide path. The guide path is illustrated as the horizontal axis passing through the 0, 180° angles of the plot. The optimal orientation of magnet assembly 28 with respect to guide path 36 would be with a line passing through the north and south poles oriented along the vertical axis extending through the 90, 270° angles. As the magnet assembly is skewed one way or the other with respect to guide path 36, the location of the predetermined position on the magnet assembly, which is considered in the illustrated embodiment to be the north face (N-face), changes with respect to the guide path (actual N-face location or "Actual"). The location of the predetermined position (N-face) with respect to the vehicle that is calculated utilizing Equation 2 ("Calculated" N-face position) produces a curve that also changes as the magnet assembly is skewed with respect to the guide path. When values of the "Calculated" and "Actual" values are compared, as illustrated in FIG. 10, a "correction" curve can be determined. As is readily apparent from FIG. 10, the "correction" curve is linear and may be defined by a specific equation as set forth in FIG. 10. Because the correction curve is linear, the relationship between the max and min peaks determined from C1 and C2 may be readily converted to a precise relationship between the predetermined position on the magnet, such as the north face, for example, and the vehicle body. It should be understood that other portions of the magnet, such as the south face, could also be utilized as the predetermined location on the magnet assembly.

Figure 11:
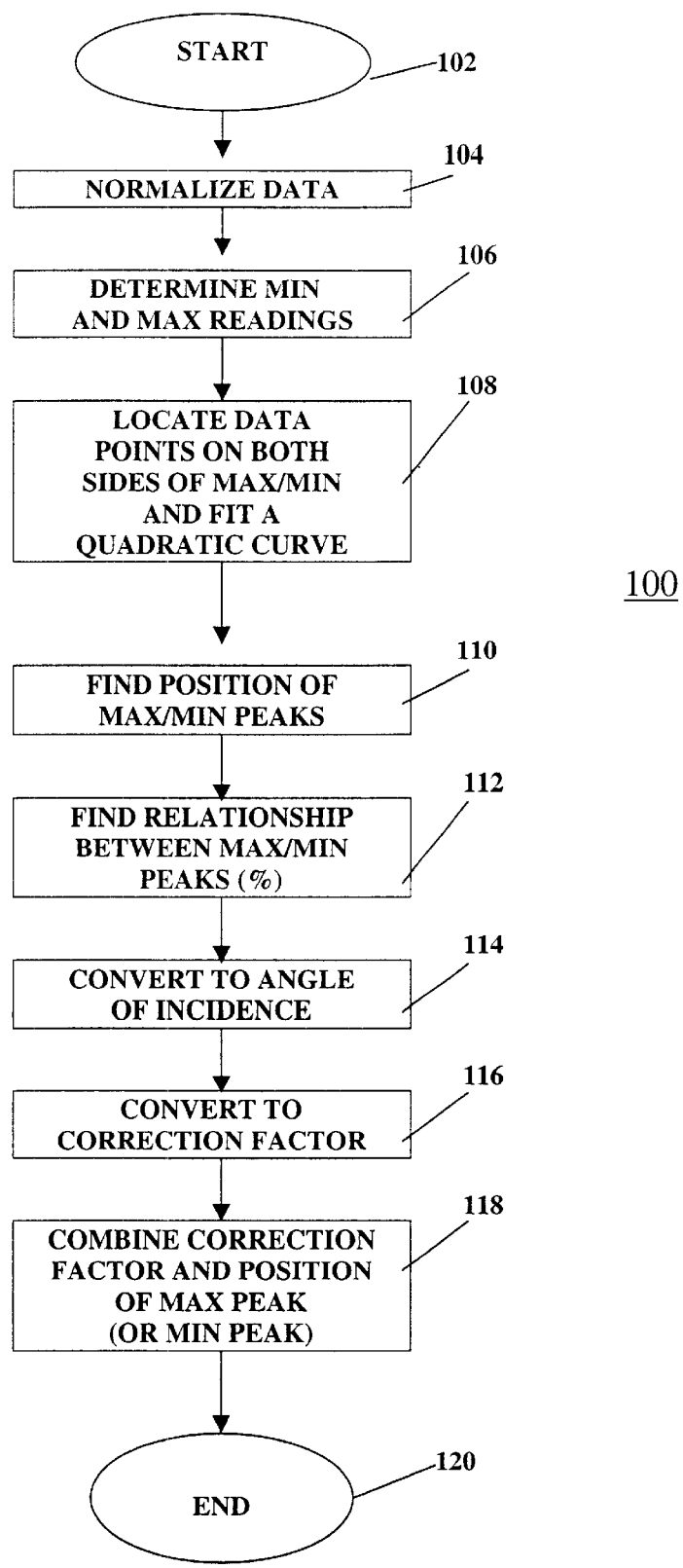
FIG. 11 is a flowchart of a method, according to the invention.

A method 100 for determining a relationship between AGV body 14 and a predetermined position of magnet assembly 28 begins at 102 by obtaining and normalizing data at 104 as sensor assembly 72 passes over a magnet assembly (FIG. 11). Data is normalized utilizing base line data obtained during calibration of sensor assembly 72. In the illustrated embodiment, sensor assembly 72 is calibrated in response to a manual calibration command, such as would be given following maintenance on the particular AGV, but other calibration criteria may be used. The data is normalized by applying particular values to bias input 62 for each of the magnetic sensors 52. After the data is normalized, rough minimum, and maximum, readings for respective polarities are obtained at 106 and data points on both sides of the min and max values are utilized at 108 in order to fit a curve, such as a quadratic curve, to the data points for the extremes of both opposite polarities of the magnetic data. Positions of the max and min peaks of the curves are obtained at 110 using Equations 1 and 2, and the relationship between the max and min peaks, expressed as a percentage, is obtained at 112 utilizing Equation 2. This relationship is converted, such as by applying to a look-up table, to obtain an angle of incidence of magnet assembly 28 with respect to the guide path at 114. The angle of incidence is converted to a correction factor at 116, such as by applying the angle of incidence to another look-up table. Alternatively, mathematical algorithms could be utilized at 114 and 116 to perform the conversion, as would be apparent to the skilled artisan. At 118, the values of the correction factor obtained at 116 and the locations of the max or min peak are combined. The method ends at 120. In order to establish pathway 13, it is necessary that an absolute point be established on each magnet assembly which may be utilized to survey the magnet in order to establish the precise position of the magnet with respect to the pathway. If the absolute point is assigned to the north pole face (and the north pole face produces the maximum peak in the magnetic data), then the correction factor is combined with the maximum peak in order to identify the position of the absolute point of the magnet assembly with respect to sensor assembly 72 and, hence, vehicle body 14. If the south pole face is utilized as the absolute point to survey off of (and the south pole produces the minimum peak in the magnet data), then the correction factor is combined with the minimum peak in order to establish the position of the magnet assembly with respect to the vehicle body. Of course, the correction factor would be different dependent upon whether the absolute point, or predetermined position, is the north pole face or the south pole face or some point in between.

Figure 12:
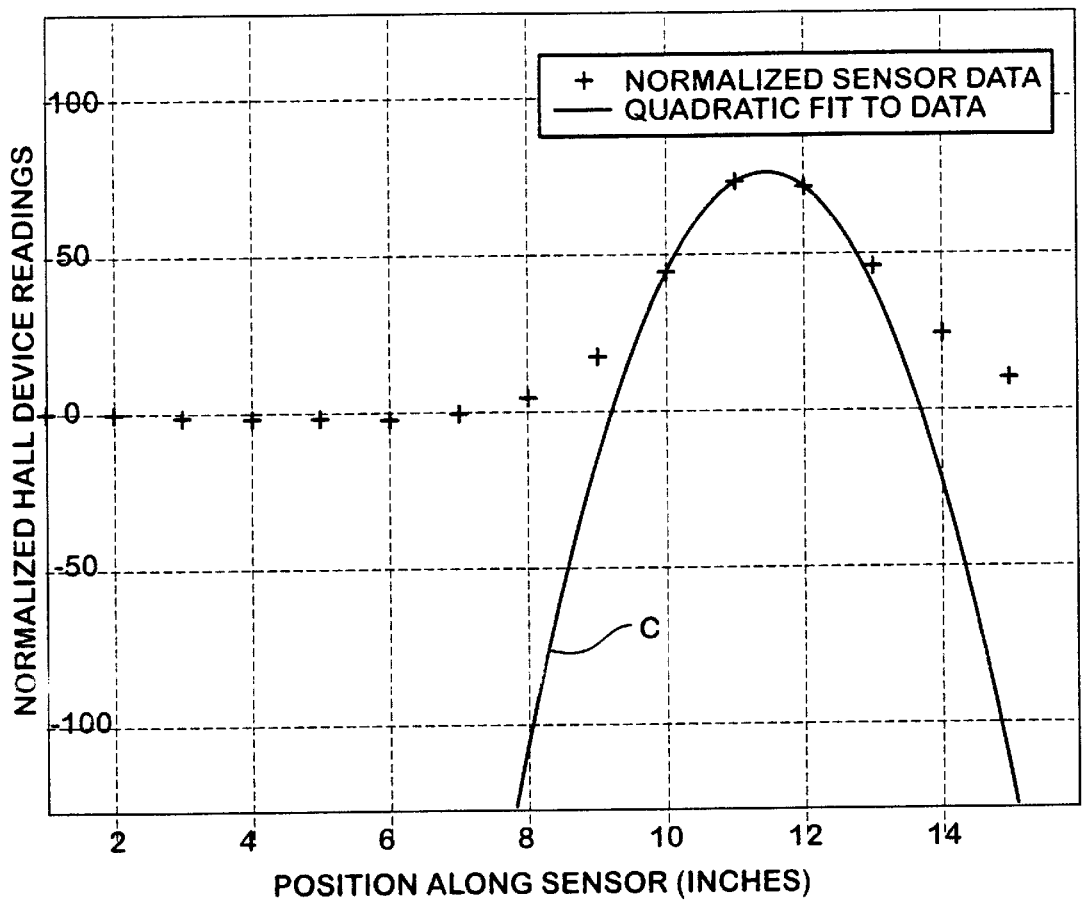
FIG. 12 is the same view as FIG. 8 of an alternative embodiment.

FIG. 12 illustrates an application of the invention to an AGV system in which only one of the magnetic poles is sensed at a time by sensor assembly 72, such as when sensing a magnet with only one pole at the pathway surface. Such a sensing scheme is utilized in the AGV systems marketed by Rapistan Systems of Grand Rapids, Mich. As can be seen by reference to FIG. 12, a curve C is fit to the data points at the maximum value of the sensed magnetic field. Equations 1 and 2 are utilized to identify a maximum point of the curve. From there, the location of the relative position of AGV body 14 and the magnet assembly 28 can be determined. Although the alternative embodiment illustrated in FIG. 12 does not provide directional information of the AGV traveling with respect to the magnet assembly, it provides a more accurate determination of the relationship between the AGV body and the magnet assembly than has heretofore been possible. Furthermore, unlike previous systems, the present invention does not have a tendency to settle on integer values of position along the sensor assembly.

Thus, the present invention provides the ability to provide an accurate measurement of the relative position between the vehicle body and a magnet assembly, even if the magnet assembly is oriented with both its magnetic poles at the pathway surface such that a bipolar magnet field is generated. This provides the ability to determine the direction that the AGV is passing over the magnet assembly. By providing this ability, the present invention makes possible an enhanced initialization station function both in terms of facilitating an increase in the number of initialization stations that may be used in very large AGV systems and in providing the ability to protect against initialization of the vehicle traveling in the wrong direction across the magnet assemblies.

The present invention also provides the ability of the magnet assemblies to function as beacons or indicators to provide, without the necessity of separate transmitters and receivers, the ability to signal to the AGV information as the AGV traverses the magnet assembly. This may be accomplished by making one or both of the poles from electromagnets thereby allowing a particular pole to be switched ON or OFF. Thus, for example, if an operator wishes to summons a vehicle to its station to pick up a load, the operator could activate a switch that, in turn, activates a south pole of a magnet assembly close to that station. As the vehicle traverses the magnet assembly in order to update its position, the vehicle would detect the north pole, which it, in the illustrated example, would be utilized to update its position and would also detect a south pole magnetic field. The vehicle would then be programmed to divert to a spur track and thereby fulfill the operator's request. Other examples would suggest themselves to the skilled artisan. For example, if a bridge or door, or the like, is capable of assuming a position in which the AGV can pass and a position in which the AGV cannot pass, information about the position of the bridge or door may be supplied to a magnet assembly ahead of the location. Dependent upon the position of the obstacle, an electromagnet may be actuated or not actuated in the magnet assembly and the vehicle interprets the state of the electromagnet as the vehicle passes over the magnet assembly.

Changes and modifications in the specifically described embodiments can be carried out without departing from the principles of the invention which is intended to be limited only by the scope of the appended claims, as interpreted according to the principles of patent law including the doctrine of equivalents.

The embodiments of the invention in which an exclusive property or privilege is claimed are defined as follows:

1. An automated-guided vehicle system, comprising:

at least one automated-guided vehicle including a body, a plurality of wheels for transporting said body across a surface, a navigation and guidance system and a sensor assembly;

a pathway for said at least one automated-guided vehicle defined by a surface and including a plurality of magnet assemblies positioned along said surface and generating magnetic fields;

said sensor assembly made up of a plurality of magnetic sensors arranged generally transverse to said pathway, said sensor assembly positioned at said body for sensing the magnetic field of each said magnet assembly as said body is transported over that magnet assembly by said wheels, said sensor assembly producing an output indicative of intensity of respective portions of the magnetic field sensed by said magnetic sensors;

said navigation and guidance system receiving said output from said sensor assembly and determining from said output a location of the substantially maximum magnitude of the magnetic field sensed by said sensor assembly at each said magnet assembly, wherein said navigation and guidance system determines a position of said body with respect to a magnet assembly as said sensor assembly passes over that magnet assembly from the substantially maximum magnitude of the magnetic field; and wherein said navigation and guidance system determines the location of the substantially maximum magnitude of the magnetic field by mathematically fitting a curve to the intensity of portions of the magnetic field sensed by said magnetic sensors and evaluating at least one feature of the fitted curve.

2. An automated-guided vehicle system, comprising:

at least one automated-guided vehicle including a body, a plurality of wheels for transporting said body across a surface, a navigation and guidance system and a sensor assembly;

a pathway for said at least one automated-guided vehicle defined by a surface and including a plurality of magnet assemblies positioned along said surface and generating magnetic fields;

said sensor assembly made up of a plurality of magnetic sensors arranged generally transverse to said pathway, said sensor assembly positioned at said body for sensing the magnetic field of each said magnet assembly as said body is transported over that magnet assembly by said wheels, said sensor assembly producing an output indicative of intensity of respective portions of the magnetic field sensed by said magnetic sensors;

said navigation and guidance system receiving said output from said sensor assembly and determining from said output a location of the substantially maximum magnitude of the magnetic field sensed by said sensor assembly at each said magnet assembly, wherein said navigation and guidance system determines a position of said body with respect to a magnet assembly as said sensor assembly passes over that magnet assembly from the substantially maximum magnitude of the magnetic field; and wherein said navigation and guidance system determines the location of the substantially maximum magnitude of the magnetic field by mathematically fitting a curve to the intensity of portions of the magnetic field sensed by said magnetic sensors, wherein said mathematically fitting a curve includes providing a quadratic fit to at least some of the portions of the magnetic field sensed by said magnetic sensors.

3. An automated-guided vehicle system, comprising:

at least one automated-guided vehicle including a body, a plurality of wheels for transporting said body across a surface, a navigation and guidance system and a sensor assembly;

a pathway for said at least one automated-guided vehicle defined by a surface and including a plurality of magnet assemblies positioned along said surface and generating magnetic fields;

said sensor assembly made up of a plurality of magnetic sensors arranged generally transverse to said pathway, said sensor assembly positioned at said body for sensing the magnetic field of each said magnet assembly as said body is transported over that magnet assembly by said wheels, said sensor assembly producing an output indicative of intensity of respective portions of the magnetic field sensed by said magnetic sensors;

said navigation and guidance system receiving said output from said sensor assembly and determining from said output a location of the substantially maximum magnitude of the magnetic field sensed by said sensor assembly at each said magnet assembly, wherein said navigation and guidance system determines a position of said body with respect to a magnet assembly as said sensor assembly passes over that magnet assembly from the substantially maximum magnitude of the magnetic field; and wherein said navigation and guidance system determines the location of the substantially maximum magnitude of the magnetic field by mathematically fitting a curve to the intensity of portions of the magnetic field sensed by said magnetic sensors, including determining at least one value of the curve and storing the at least one value of the curve for said magnet assemblies, wherein said at least one value is chosen from a maximum value of the curve and a minimum value of the curve.

4. The automated-guided vehicle system in claim 3 including comparing multiple readings of the at least one value of the curve at the same magnet assembly in order to diagnose the condition of that magnet assembly.

5. The automated-guided vehicle system in claim 4 wherein the multiple readings of the at least one value of the curve are made for the same magnet by multiple passes by the same vehicle over that magnet assembly.

6. The automated-guided vehicle system in claim 4 wherein said at least one automated-guided vehicle includes a plurality of automated-guided vehicles and wherein the multiple readings of the at least one value of the curve are made for the same magnet by multiple vehicles passing over that magnet assembly.

7. An automated-guided vehicle system, comprising:

at least one automated-guided vehicle including a body, a plurality of wheels for transporting said body across a surface, a navigation and guidance system and a sensor assembly;

a pathway for said at least one automated-guided vehicle defined by a surface and including a plurality of magnet assemblies positioned along said surface and generating magnetic fields;

said sensor assembly made up of a plurality of magnetic sensors arranged generally transverse to said pathway, said sensor assembly positioned at said body for sensing the magnetic field of each said magnet assembly as said body is transported over that magnet assembly by said wheels, said sensor assembly producing an output indicative of intensity of respective portions of the magnetic field sensed by said magnetic sensors;

said navigation and guidance system receiving said output from said sensor assembly and determining from said output a location of the substantially maximum magnitude of the magnetic field sensed by said sensor assembly at each said magnet assembly, wherein said navigation and guidance system determines a position of said body with respect to a magnet assembly as said sensor assembly passes over that magnet assembly from the substantially maximum magnitude of the magnetic field; and wherein said navigation and guidance system determines the location of the substantially maximum magnitude of the magnetic field by mathematically fitting a curve to the intensity of portions of the magnetic field sensed by said magnetic sensors, wherein at least some of said magnet assemblies each produce a bipolar magnetic field at said surface extending generally transverse to said pathway with respect to movement of said at least one automated-guided vehicle along said pathway and wherein said navigation and guidance system assembly determines a correction factor correcting for offset between the maximum magnitude of the magnetic field and a predetermined location of that magnet assembly including correcting for any skew of the bipolar magnetic field with respect to said pathway.

8. The automated-guided vehicle system in claim 7 wherein said navigation and guidance system determines from said output locations of maximum magnitudes of both opposite polarities of the bipolar magnetic field sensed by said sensor assembly and wherein said navigation and guidance system determines said correction factor from the locations of maximum magnitudes of both opposite polarities of the bipolar magnetic field.

9. The automated-guided vehicle system in claim 7 wherein said at least one magnet for at least some of said magnet assemblies is a permanent magnet.

10. The automated-guided vehicle system in claim 9 wherein said pair of opposite magnetic poles for said at least some of said magnet assemblies is defined by opposite magnetic poles of one magnet.

11. The automated-guided vehicle system in claim 9 wherein said pair of opposite magnetic poles for said at least some of said magnet assemblies is defined by opposite magnetic poles of two permanent magnets.

12. The automated-guided vehicle system in claim 7 wherein at least one of said opposite magnetic poles for at least some of said magnet assemblies is defined by an electromagnet.

13. The automated-guided vehicle system in claim 12 wherein said electromagnet is selectively actuated to provide a signal to said at least one automated-guided vehicle at said sensor assembly as it passes over the associated magnet assembly.

14. An automated-guided vehicle system, comprising:
at least one automated-guided vehicle including a body, a plurality of wheels for transporting said body across a surface, a navigation and guidance system and a sensor assembly;
a pathway for said at least one automated-guided vehicle defined by a surface and including a plurality of magnet assemblies positioned along said surface and generating magnetic fields, each of said magnet assemblies including at least one magnet defining a pair of opposite magnetic poles;
at least some of said magnet assemblies each producing a bipolar magnetic field at said surface extending generally transverse to said pathway with respect to movement of said at least one automated-guided vehicle along said pathway;
said sensor assembly made up of a plurality of magnetic sensors arranged generally transverse to said pathway, said sensor assembly positioned at said body for sensing the bipolar magnetic field of each said magnet assembly as said body is transported over that magnet assembly by said wheels, said sensor assembly producing an output indicative of magnitude and polarity of respective portions of the bipolar magnetic field sensed by said magnetic sensors;
said navigation and guidance system receiving said output from said sensor assembly and determining from said output locations of the substantially maximum magnitude of the polarities of the bipolar magnetic field sensed by said sensor assembly at each said magnet assembly, wherein said navigation and guidance system determines a position of said body with respect to a magnet assembly as said sensor assembly passes over that magnet assembly from the substantially maximum magnitudes of the polarities of the bipolar magnetic field sensed by said sensor assembly; and
wherein said navigation and guidance system determines a correction factor for correcting offset between the substantially maximum magnitude of the polarities and a predetermined location on that magnet assembly including correcting for any skew of the bipolar magnetic field with respect to said pathway for that magnet assembly, wherein said navigation and guidance system corrects the position of said body with respect to a magnet assembly with said correction factor for that magnet assembly.

15. The automated-guided vehicle system in claim 14 wherein said navigation and guidance system determines the location of maximum magnitudes of the polarities of the bipolar magnetic field by mathematically fitting at least one curve to a portion of the bipolar magnetic field sensed by said magnetic sensors and determining a maximum value of the at least one curve.

16. The automated-guided vehicle system in claim 15 wherein said mathematically fitting at lease one curve includes providing a quadratic fit to at least some of the portions of the magnetic field sensed by said magnetic sensors.

17. The automated-guided vehicle system in claim 15 wherein said navigation and guidance mathematically fits a curve to each of the opposite polarities of the bipolar magnetic field at each said magnet assembly and determines a maximum value of each curve.

18. The automated-guided vehicle system in claim 17 wherein said navigation and guidance system determines said correction factor from locations of respective maximum values of curves fitted to the opposite polarities of the bipolar magnetic field.

19. The automated-guided vehicle system in claim 14 including a plurality of vehicle initiation locations to said pathway, each of said vehicle initiation locations including at least two said magnet assemblies, wherein said navigation and guidance system responds to an orientation of the bipolar magnetic fields of the at least two magnet assemblies.

20. The automated-guided vehicle system in claim 19 wherein the orientations of the bipolar magnetic fields are unique to each of said initiation locations, thereby allowing said navigation and guidance system to distinguish one of said initiation locations from other of said initiation locations.

21. The automated-guided vehicle system in claim 19 wherein the orientations of the bipolar magnetic fields are unique for orientation of each of said initiation locations with respect to said pathway, thereby allowing said navigation and guidance system to determine an orientation that said at least one automated-guided vehicle is initiated to said pathway.

22. The automated-guided vehicle system in claim 14 wherein said at least one magnet for at least some of said magnet assemblies is a permanent magnet.

23. The automated-guided vehicle system in claim 22 wherein said pair of opposite magnetic poles for said at least some of said magnet assemblies is defined by opposite magnetic poles of one magnet.

24. The automated-guided vehicle system in claim 22 wherein said pair of opposite magnetic poles for said at least some of said magnet assemblies is defined by opposite magnetic poles of two magnets.

25. The automated-guided vehicle system in claim 14 wherein at least one of said opposite magnetic poles for at least some of said magnet assemblies is defined by an electromagnet.

26. The automated-guided vehicle system in claim 24 wherein said electromagnet is selectively actuated to provide a signal to said at least one automated-guided vehicle as said sensor assembly passes over the associated magnet assembly.

27. The automated-guided vehicle system in claim 14 wherein said predetermined location of that magnet assembly comprises a pole face corresponding to the at least one polarity.

* * * * *